(12) United States Patent
Greef et al.

(10) Patent No.: US 6,668,257 B1
(45) Date of Patent: *Dec. 23, 2003

(54) MIGRATING NON-PERSISTENT OBJECTS WHEN ONE OR MORE OF THE SUPERCLASS FIELDS OF THE OBJECT ARE MODIFIED

(75) Inventors: Arthur Reginald Greef, Seattle, WA (US); Thomas Robert Maguire, Brewster, NY (US); Frank Castellucci, Amawalk, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 955 days.

(21) Appl. No.: 08/964,096

(22) Filed: Nov. 6, 1997

(51) Int. Cl.$^7$ .............................................. G06F 17/30
(52) U.S. Cl. .................. 707/102; 707/100; 707/103; 707/104.1
(58) Field of Search .................. 707/1, 2, 3, 10, 707/100–104.1, 200, 203, 511, 514; 395/200.31, 200.33, 200.48, 200.49, 500; 717/2, 3, 5; 709/317, 332, 330, 316

(56) References Cited

U.S. PATENT DOCUMENTS

| | | | | |
|---|---|---|---|---|
| 5,295,256 A | * | 3/1994 | Bapat | 395/500 |
| 5,499,365 A | * | 3/1996 | Anderson et al. | 707/203 |
| 5,535,389 A | * | 7/1996 | Elder et al. | 395/712 |
| 5,664,182 A | * | 9/1997 | Nierenberg et al. | 707/102 |
| 5,797,007 A | * | 8/1998 | Erickson et al. | 395/683 |
| 5,809,507 A | * | 9/1998 | Cavanaugh, III | 707/103 |
| 5,848,419 A | * | 12/1998 | Hapner et al. | 707/103 |

* cited by examiner

*Primary Examiner*—Srirama Channavajjala
(74) *Attorney, Agent, or Firm*—Steven J. Meyers

(57) ABSTRACT

This Object-Oriented programming system migrates persistent objects when their class declarations are modified. The objects and their class descriptions are persistently stored and the persistent versions of an objects' superclass descriptions are compared to later versions of the objects' superclass descriptions. When a persistent version and a later version of the class description for the object differ, the object is migrated from the persistent version to the later version based on the differences between the two superclass descriptions. Finally, the migrated object is persistently stored with changes in its persistent class description.

16 Claims, 2 Drawing Sheets

A Class Declaration

Class Declaration with Member Data

Buffer of Object Data

MIGRATING NON-PERSISTENT OBJECTS WHEN ONE OR MORE OF THE SUPERCLASS FIELDS OF THE OBJECT ARE MODIFIED

REFERENCE TO CO-PENDING PATENT APPLICATION

Reference is made to a co-pending patent application entitled "A FLEXIBLE OBJECT PERSISTENCE FRAMEWORK FOR STORING OBJECTS ON HETEROGENEOUS PERMANENT STORAGE SYSTEMS", Arthur R. Greef et al., Ser. No. 08/964,097 filed on even date herewith.

BACKGROUND INFORMATION

1. Field of Invention

This invention represents a system for migrating persistent objects when their class declarations are modified.

2. Background Art

The literature defines an "object-oriented" program as one that (1) uses objects, not algorithms as its functional building blocks, (2) has each object being an instance of some class, and (3) has classes related to each other via inheritance relationships. An "object" comprises a data structure and a set of operations or set of methods, that can access and manipulate data. A "Class" is an abstract representation of an object and can be seen as a template for an object. An executing software program creates instances of these Classes called objects. Classes can be interrelated via an inheritance relationship to facilitate class data and operation reuse.

For example, we can create an abstract class termed "employee" that comprises the data and operations common to all employees. We can then create more specific employee classes called "Full-Time" and "Part-Time" to represent two specific employees. The "Full-Time" and "Part-Time" classes which have inheritance relationships with the Employee Class, will inherit the common data and operations from the abstract Employee Class. Interrelated classes form a class hierarchy whose topmost class is termed the "Root". Abstract classes are super-classes of more specific derived classes. Derived classes are subclasses of more abstract classes. A single inheritance class hierarchy is a hierarchy in which each class in the hierarchy can have no more than one parent. Whereas a multiple inheritance hierarchy is a hierarchy in which each class in the hierarchy can have more than one parent.

Regarding the term "persistence", it can be defined as follows. In "Object-Oriented-Programming, the permanence of an object, particularly relevant in the context of object-oriented databases, which maintains a distinction between objects created only for the duration of execution and those intended for permanent storage.

When an object-oriented program executes, it creates objects as specified by a program. These objects are created in temporary memory. The memory is termed temporary as the contents of this memory are lost whenever the program terminates. If a program needs to have objects persist even when the computer program terminates, then the program needs to store the created objects out to permanent storage, typically in hard drive. This is usually performed by creating a persistence class that declares the data and operations necessary for writing and reading (their data members) to and from permanent memory. All objects that need to be stored persistently must be instances of a class that has either a direct or transitive inheritance relationship with this persistence class.

The persistence class usually has at least two virtual operations declared that are implemented by all derived classes. One operation writes each of the object's class data members out to a buffer and the other operation reads data from a buffer and initializes an object's class data members. The write operation usually begins at the top of the object's class hierarchy, writes out the class identifier (usually some number) and then writes out the data members to a buffer. When this is done, control is passed to a subclass in the class hierarchy and the same write operation is performed for that class. This is continued until there are no more subclasses in the class hierarchy. The buffer is then written to permanent storage.

This process is reversed when recreating, the object from permanent storage. A buffer is filled with data, the first field of which is a class identifier. This is used to create an object of the specified class. Control is then passed to the virtual read operation of the topmost class in the class hierarchy. This operation reads data from the buffer and initializes the data members. Control is then passed to the subclass and the process is repeated all the way down the class hierarchy.

The problem with saving and retrieving objects from permanent storage arises when an object's class hierarchy is modified. If a new class hierarchy relationship is added or removed from any class declarations that form part of a persistent object's declaration, that object will not be able to be recreated in temporary memory. This is because the content of the data buffer and the control passing between classes and their subclasses will be out of sync. If a class is inserted or appended to a persistent object's class hierarchy, then the contents of the buffer read operation will not match the member data of the appended or inserted class, The program will thus terminate with an error.

A typical solution to this problem is to create a text representation of the persistent objects. When the class hierarchy is modified, the text form representation is read into a parser, tokenized into atomic elements and then used to recreate all the objects, often in temporary memory. These objects are then stored persistently and the problem is alleviated.

SUMMARY OF INVENTION

This invention takes a more automated approach to the problem of migrating persistent objects when their class declarations are modified. It does so in a manner that relieves the user from having to migrate their persistent objects whenever there is a program modification. Objects are automatically migrated to new class hierarchy declarations and stored in permanent memory. First, both the objects and their class descriptions are persistently stored and the persistent version of an object's class description is compared against a later version of an object's class description. The system then migrates objects from their previous version to the later version based on the differences between the two class descriptions. Finally, the system persistently stores the migrated object with its new class description.

DETAILED DESCRIPTION OF THE INVENTION

Figure 1:
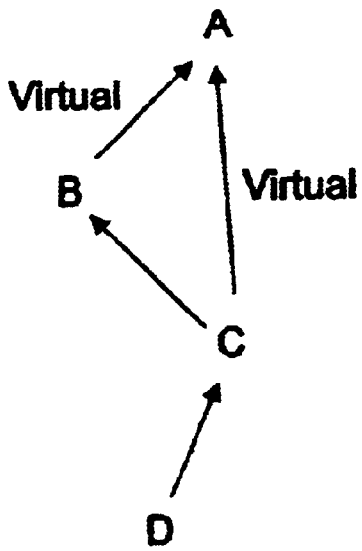
FIG. 1 This represents a class declaration.

The following scenario (using C++ Programming Language) is to be considered, in which a program has a class declaration as shown in FIG. 1 and the class hierarchy forms a "Direct Acyclic Graph" (DAG). Class D has a base class C which has the base classes B and A. The virtual declaration on base class A means that the operating system must not allocate memory for class A twice, only once. If the base class were not virtual then there would be two memory blocks allocated for base class A.

When the program is started, an implementation class DAG is created from this class declaration. If we assume that the order of construction is from top-to-bottom, left-to-right then we create the class DAG data structure shown in Table 1 (note that the table format shown is an implementation example, the actual data structure for recording these inheritance relationships could be any data structure).

TABLE 1

An Implementation class DAG

| Derived Class | Base Classes |
|---|---|
| A | |
| B | virtual A |
| C | B, virtual A |
| D | C |

This table is read from left-to-right and top to bottom. It shows that class A has no base classes. Class B has virtual class A as a base class. Class C has base class B and virtual base class A. Class D has base class C. When we create an object O, an instance of class D then class A is created first, followed by class B, then the virtual class A, then class C and finally class D. This is computed by tracing all links up the table. Note that the table is a representation of the DAG.

Figure 2:
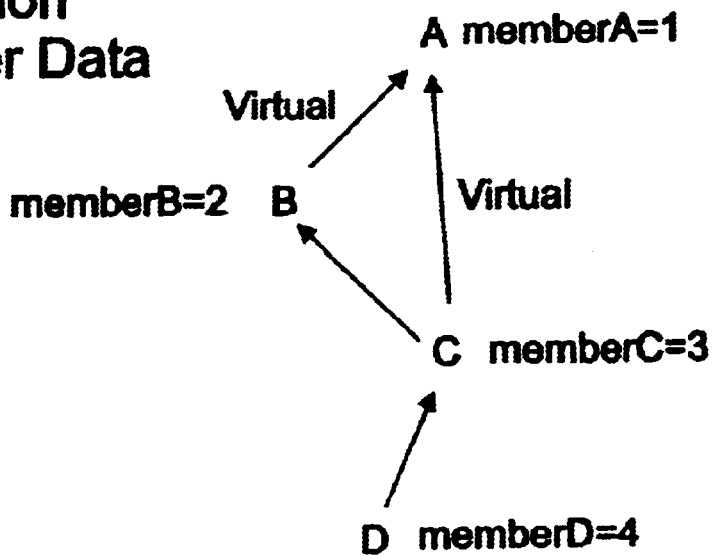
FIG. 2 Class declaration with member data.

When the program is first started or when a new database is created, there is no persistent class DAG in the permanent storage. The implementation class DAG is thus copied as the persistent class DAG. This DAG is stored on permanent memory when the program is terminated. Any objects that have been created can also be stored to a permanent store. An object's data members are stored in order of construction, consider, for example, FIG. 2. The class A has the member A attribute whose value is 1, class B has the member B attribute whose value is 2, class C has the member C attribute whose value is 3 and class D has the member D attribute whose value is 4.

Figure 3:
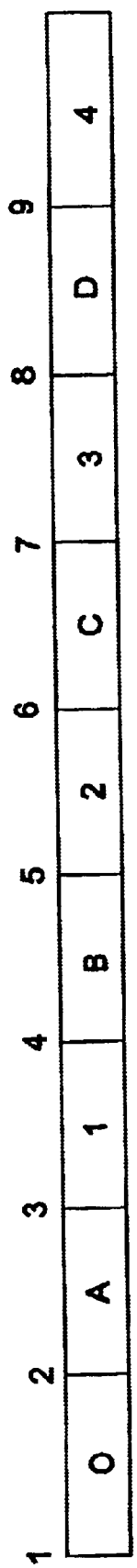
FIG. 3 Representation of the Buffer of object data

If we create an object O that is an instance of class D and then store this to persistent storage, we create a buffer with format shown in FIG. 3 and store this to permanent store. Note that each field of the buffer is indexed. An implementation could use byte offsets to accomplish a similar indexing scheme. The class identifier is written to the buffer before the class member data is written to the buffer. The virtual class data is not written to the buffer. Note that the letter O in the buffer designates the object's unique identifier.

Figure 4:
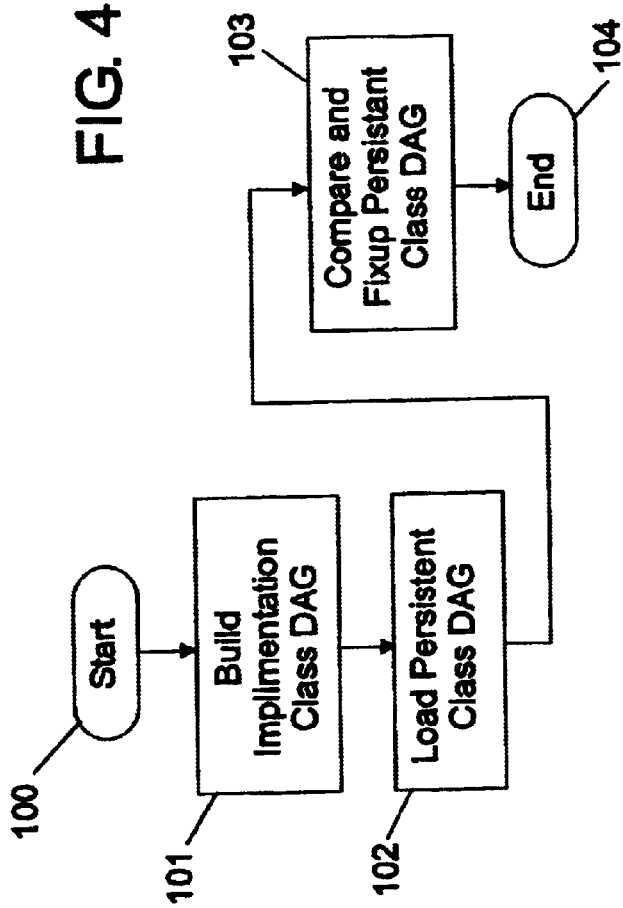
FIG. 4 This flow chart represents the method of creating and loading class DAG (Direct Acyclic Graph)

When the program is restarted, FIG. 4 at 100, the implementation class DAG will be recreated by the program 101 and the persistent DAG will be read from permanent storage 102. The program will then compare 103 the implementation class DAG to the persistent class DAG and fix up the persistent class DAG representation if the implementation class DAG has been modified as shown in 103 FIG. 4. The process ends at 104.

The following modifications to the implementation class declaration are possible, involving the following scenarios.
I. To "delete a base class inheritance relationship", we delete the base class B from class C's declaration in FIG. 1 and Table 1, then the implementation class DAG will look as follows:

TABLE 2

| Derived Class | Base Classes |
|---|---|
| A | |
| B | virtual A |
| C | virtual A |
| D | C | and the persistent class DAG will look as follows:

TABLE 3

| Derived Class | Base Classes |
|---|---|
| A | |
| B | Virtual A |
| C | B (Skip), virtual A (Find) |
| D | C |

The action (Table 3) "skip", in parenthesis tells the object reader to not read in the member data for class B. The object reader loading object O will thus start with the data members (see FIG. 3) for virtual class A (index 3, FIG. 3), then class C (index 7, FIG. 3) and then class D (index 9, FIG. 3). The action "find" tells the object loader to find the location of class A's member data. The data for virtual class A is loaded even through the base class is declared virtual. This is due to the fact that this is the first time the virtual base class in encountered. Subsequent declarations of virtual base class A will not be loaded.
II. To add a "base class inheritance relationship" such as class B to class D's class declaration in FIG. 1 and Table 1, then the implementation class DAG will look as follows Table 4:

TABLE 4

| Derived Class | Base Classes |
|---|---|
| A | |
| B | Virtual A |
| C | B, virtual A |
| D | C, B | and the persistent class DAG will look as follows Table 5:

TABLE 5

| Derived Class | Base Classes |
|---|---|
| A | |
| B | Virtual A |
| C | B, virtual A |
| D | C, B (find) |

The object reader loading object O will thus start with the data members (see FIG. 3) for class A (index 3), then class B (index 5) again as it is not virtual, then class C (index 7) and then class D (index 9). Note that the virtual base class A is not loaded as it already is loaded through a previous declaration in class B.
III Delete a "virtual base class inheritance relationship". If we delete the virtual base a from class C's declaration in FIG. 1 and Table 1, then the implementation class DAG will look as follows:

TABLE 6

| Derived Class | Base Classes |
|---|---|
| A | |
| B | Virtual A |
| C | B |
| D | C | and the persistent class DAG will look as follows:

TABLE 7

| Derived Class | Base Classes |
|---|---|
| A | |
| B | Virtual A |
| C | B, virtual A |
| D | C |

The object reader loading O will thus start with the data numbers (see FIG. 3) for class A (index 3), then class B (index 5), then class C (index 7) and then Class D (index 9). Note that the object loader would not have loaded virtual class A in any case as it is declared virtual and a previous declaration in B would have already loaded the class member.

IV Adding a "virtual base class inheritance relationship". If we add the virtual base B to D's class declaration FIG. 1 and Table 1 then the implementation class DAG will look as follows:

TABLE 8

| Derived Class | Base Classes |
|---|---|
| A | |
| B | Virtual A |
| C | B, virtual A |
| D | C, virtual B | and the persistent class DAG will look as follows:

TABLE 9

| Derived Class | Base Classes |
|---|---|
| A | |
| B | A |
| C | B, virtual A |
| D | C, virtual B (find) |

Note that the object loader does not load virtual class A in any case as it is declared virtual and a previous declaration in B would have already loaded the class member data.

V. Change a "base class inheritance relationship to virtual base class inheritance relationship". If we change the base class B from C's declaration in FIG. 1, and Table 1 so that it is virtual then the implementation class DAG will look as follows:

TABLE 10

| Derived Class | Base Classes |
|---|---|
| A | |
| B | virtual A |
| C | virtual B, virtual A |
| D | C | and the persistent class DAG will look as follows:

TABLE 11

| Derived Class | Base Classes |
|---|---|
| A | |
| B | virtual A |
| C | virtual B, virtual A |
| D | C |

The object reader loading object O will thus start with the data numbers (FIG. 3) for class A (index 3), then class B (index 5), then class C (index 7) and then class D (index 9) as before as the class A is the first virtual class encountered.

VI Change a "virtual base class inheritance relationship to base class inheritance relationship". If we change the virtual base A from class C's declaration in FIG. 1, and Table 1 so that it is simply a base class then the implementation class DAG will look as follows:

TABLE 12

| Derived Class | Base Classes |
|---|---|
| A | |
| B | virtual A |
| C | B, A |
| D | C | and the persistent class DAG will look as follows:

TABLE 13

| Derived Class | Base Classes |
|---|---|
| A | |
| B | virtual A |
| C | B, A (find) |
| D | C |

The object reader loading object O will thus start with the data members (see FIG. 3) for class A (index 3), then class B (index 5), then class A (index 3) again, then class C (index 7) and then class D (index 9).

VII. Modify the "construction order of base class inheritance relationships". If we modify the construction order of the base classes for C so that the base class B from class C's declaration in FIG. 1 and Table 1 is declared after the virtual A base class, then the implementation class DAG will look as follows:

TABLE 14

| Derived Class | Base Classes |
|---|---|
| A | |
| B | virtual A |
| C | virtual A, B |
| D | C | and the persistent class DAG will look as follows:

TABLE 15

| Derived Class | Base Classes |
|---|---|
| A | |
| B | virtual A |
| C | B (skip), virtual A (find), B (find) |
| D | C |

The action "skip" in parenthesis tells the object reader to not read in the member data for class B. The object reader loading object O will thus start with the data members (see FIG. 3) for class A (index 3), then class B (index 5), then class C(index 7) and then class D (index 9).

What is claimed is:

1. In an object oriented computer program product recorded on a recording medium, software for performing a method comprising the steps of:
   storing in permanent storage a persistent class description including a unique class identifier of a class of objects and an initial set of one or more fields each field for a superclass from which the class of objects inherits attributes;
   preparing for an object which is an instance of said class a nonpersistent version of said class description;
   providing for said object a modified set of fields containing at least one modification to said initial set of fields such modification for a field for one of the superclasses from which the object inherits so that the object with the modified set of fields having the at least one modification is not an instance of said class; and
   migrating the object to the modified set of fields in a persistent version by automatically storing in permanent storage with the migrated object the initial set of fields unchanged by the at least one modification along with any action necessary to change the initial set of fields to the modified set of fields to provide for any difference in the migrated objects inheritance pattern from that in the persistent class description so that the migrated object can be thereafter reproduced in temporary memory using the initial set of fields of the class stored with the migrated object.

2. The method of claim 1, wherein said any action comprises an action to be taken by an object reader when recreating the migrated object with the modified set of fields in temporary memory.

3. The method of claim 2, wherein the action is for the object reader to skip a superclass represented by a field contained in the persistent class description when the migrated object does not inherit from the class.

4. The method of claim 2, wherein the any action is for the object reader to find an additional superclass not represented by a field contained in the persistent class description when the migrated object inherits from the additional superclass.

5. The method of claim 2, wherein the action is for the object reader to make a class represented by a field contained in the persistent class description virtual when the migrated object inherits from the class through more than one path.

6. The method of claim 2, including associating the any action for the object reader with the field for the superclass affected by that action.

7. A computer program product on a computer usable medium for an object oriented program characterized by:
   instructions for storing in permanent storage a persistent version of an initial class description including a unique identifier of a class of objects and an initial set of one or more fields for superclasses from which all objects in the class inherit;
   instructions for comparing the initial class description to a modified version of said class description for an object which with its initial class description is an instance of said class and with its modified version of the class description is not such an instance which modified version contains a modified set of fields for one or more superclasses from which the object inherits attributes;
   instructions for actions that must be taken by an object reader to translate the initial set of fields to the modified set of fields; and
   instructions for migrating the object from its initial version to a modified version based on the differences between the initial and modified class descriptions by automatically storing in permanent storage with said migrated object said actions of an object reader along with the initial set of fields unchanged by any difference between the initial and modified class descriptions enabling the object reader to correct for differences in the objects inheritance pattern from that in the persistent class description when the object reader recreates the migrated object in temporary memory.

8. The product of claim 7, including placing an instruction for the object reader to take an action affecting an index for a superclass along with the index affected by the action.

9. The product of claim 8, including an instruction providing an action by the object reader to skip a superclass contained in the persistent class description when the migrated object does not inherit from the superclass.

10. The product of claim 9, including an instruction providing for the object reader to take action to find a superclass not in the persistent class description where the migrated object inherits from the superclass.

11. The product of claim 7, including an instruction for providing an action for the object reader to make a superclass virtual when the migrated object inherits from the superclass through more than one path.

12. In a computer program product recorded on a computer usable medium characterized by having an object oriented program for performing a method comprising the steps of:
   storing in permanent storage a persistent class description including a unique class identifier of a class of objects and an initial set of one or more fields for superclasses which all the objects in the class inherit;
   preparing from an object which is an instance of said class a modified version of said class description which version for said object contains a modified set of fields each field for one of one or more of the superclasses from which the object inherits so that the object with the modified set of fields is no longer an instance of said class;
   determining what actions are necessary by an object reader to change the initial set of fields to the modified set of fields;
   migrating the object to the version of the class description containing the modified set of fields by automatically storing in permanent storage with the migrated object the initial set of fields along with said actions of an object reader; and
   having the object reader change the initial set of fields to the modified version of the fields using said actions when recreating the migrated object in temporary memory.

13. The method of claim 12, including associating the action to be taken by the class reader with the superclass index affected by the action.

14. The method of claim 13, including providing an action for the object reader to skip a superclass field contained in the initial class description when the migrated object does not inherit from that superclass.

15. The method of claim 13, including providing an action for the object reader to find a superclass not contained in the persistent class description where the migrated object inherits from the superclass.

16. The method of claim 13, including providing an action for the object reader to make a class contained in the initial class description virtual when the migrated object inherits from the class through more than one path.

* * * * *